United States Patent [19]

Marantette

[11] Patent Number: 4,967,154

[45] Date of Patent: Oct. 30, 1990

[54] DYNAMIC TUBE RUNOUT MEASURING METHOD AND APPARATUS WITH SQUARE WAVE ENERGIZED RELUCTANCE MEASURING COILS

[75] Inventor: William F. Marantette, Torrance, Calif.

[73] Assignee: Optima Industries, Inc., Torrance, Calif.

[21] Appl. No.: 406,578

[22] Filed: Sep. 13, 1989

[51] Int. Cl.$^5$ .................. G01B 7/31; G01B 7/14; G01H 11/02; B23B 49/00

[52] U.S. Cl. .................. 324/207.12; 73/660; 324/207.19; 324/207.25; 340/680; 340/683; 408/16

[58] Field of Search .......... 324/207, 208, 225, 234, 324/238, 243; 73/660; 408/6, 8–11, 13, 16; 340/680, 683, 686, 870.35

[56] References Cited

U.S. PATENT DOCUMENTS

| | | | |
|---|---|---|---|
| 2,864,997 | 12/1958 | Von Basel | 324/234 |
| 2,879,470 | 3/1959 | Wright | 324/207 |
| 3,020,786 | 2/1962 | Graffenrieo et al. | 77/3 |
| 3,310,796 | 3/1967 | Sanders | 340/271 |
| 3,454,869 | 7/1969 | Strauss et al. | 324/234 X |
| 3,469,475 | 9/1969 | Watt | 77/4 |
| 3,504,581 | 4/1970 | Weichbrodt | 82/1 |
| 3,681,978 | 8/1972 | Mathias et al. | 73/71.4 |
| 3,683,354 | 8/1972 | Enk | 340/271 |
| 3,715,659 | 2/1973 | Abnett et al. | 324/243 |
| 4,209,778 | 6/1980 | Wehde et al. | 340/677 |
| 4,644,270 | 2/1987 | Oates et al. | 324/207 |
| 4,661,777 | 4/1987 | Tornblom | 324/225 |
| 4,857,919 | 8/1989 | Braswell | 324/208 X |

*Primary Examiner*—Gerard R. Strecker
*Attorney, Agent, or Firm*—Poms, Smith, Lande & Rose

[57] ABSTRACT

Runout of a high speed, small diameter test rod in a drill spindle is measured by locating a pair of magnetic cores on opposite sides of the rod to establish a pair of magnetic circuits which include the air gaps between the rod and each of the cores. Coils on the cores are driven by square waves, which are differentially combined at the junction of the coils. The square waves have a frequency many times greater than the rotational speed of the rod, and amplitude of successive half cycles of the combined square waves are sampled after suitable delay times. The difference between the samples is a measure of the instantaneous rod runout while the rod is rotating. The instantaneous runout signal varies sinusoidally as the rod rotates and is peak detected to display the magnitude of the peak to peak voltage as a measure of rod runout. An auto-centering compensation is provided to prevent the runout signal from saturating because of static offset of the cores from a precisely centered position on opposite sides of the rod. A signal representing the average position of the rod centerline during its rotation relative to the two cores is employed to modulate opposite phase square waves which are combined with the sensor output from the junction of the two coils so as to diminish the sensor output according to the amount of static offset.

14 Claims, 3 Drawing Sheets

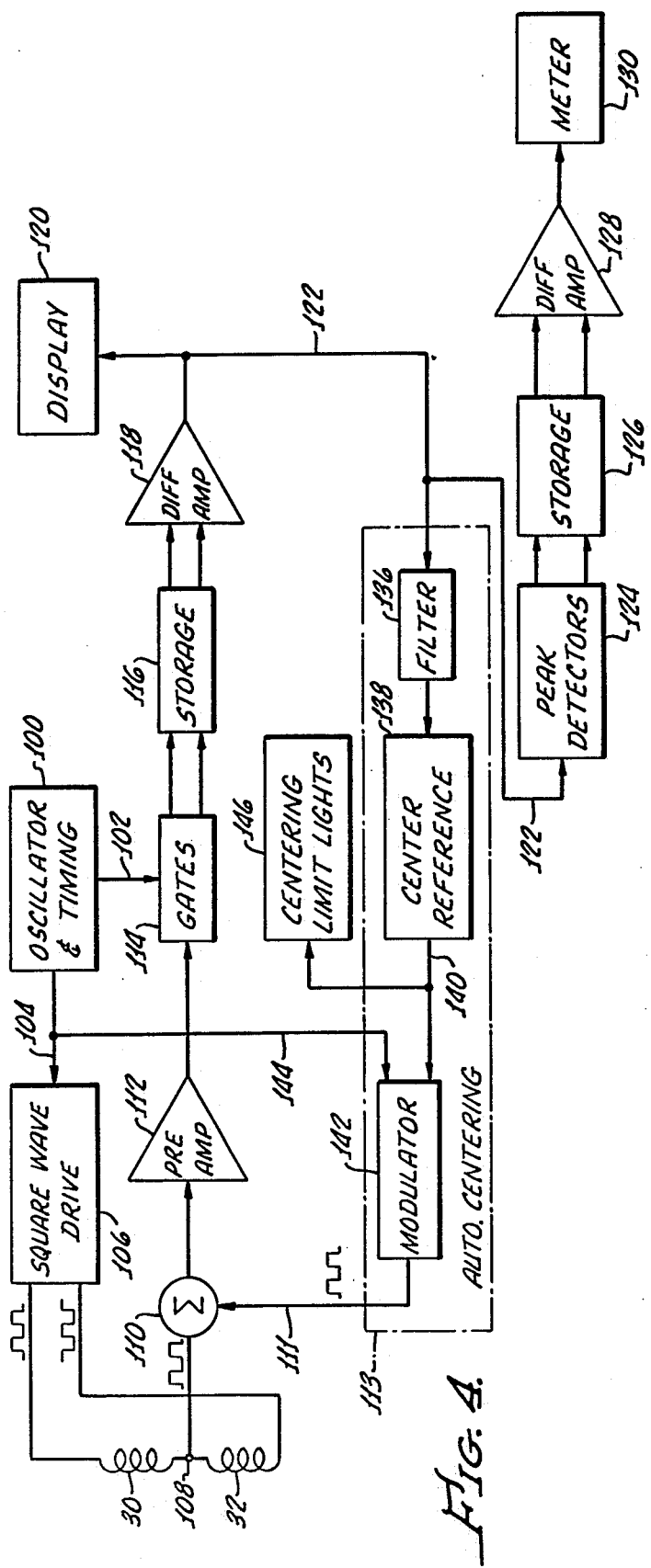
Fig. 4.
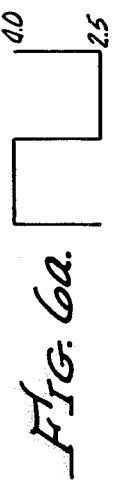
Fig. 6a.
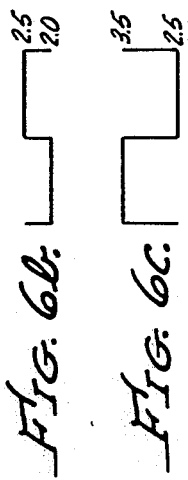
Fig. 6b.
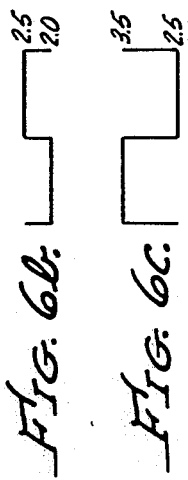
Fig. 6c.
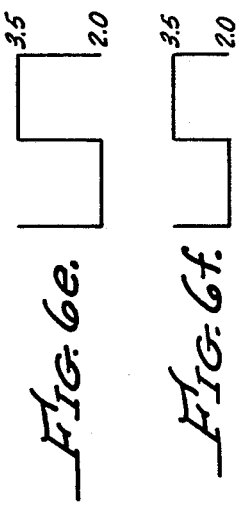
Fig. 6d.
Fig. 6e.
Fig. 6f.

DYNAMIC TUBE RUNOUT MEASURING METHOD AND APPARATUS WITH SQUARE WAVE ENERGIZED RELUCTANCE MEASURING COILS

BACKGROUND OF THE INVENTION

The present invention relates to dynamic measurement of runout of a rotating member, and more particularly concerns precision measurement of wobble of a high speed member while it rotates.

High speed drilling machines employed in the production of holes in circuit boards and similar items often use very small bits, having a diameter as small as 4 mils, operating at very high speeds, up to 100,000 rpm or greater. Bit breakage is common with such machines, but causes of the breakage are not always known with certainty. Wobble of the bit as it rotates at very high speed is a significant factor in bit breakage. Spindle runout is commonly measured at low rotational speeds by an instrument having a sensitive arm that physically contacts a precision drill rod as it is slowly rotated to provide a readout on a gauge of the amount of runout. The drill rod or pin replaces the bit for measurement of spindle runout. Such instruments, do not provide useful measurement of runout at bit operating speed, at which speed runout may be considerably different than it is at low speed. A capacitative system has been employed for dynamic runout measurement, including an arrangement for measuring capacitance between one side of the rod and a capacitive sensor on the instrument. Such systems are complex, costly, and subject to inaccuracies because of susceptibility to extraneous vibration. Known magnetic systems often employ differential transformers or permanent magnets but fail to achieve adequate precision of measurement. Measurement with precision of a few millionths of an inch is desired for optimum dynamic runout measurement, but heretofore has not been available with reliability or relatively simple, easily operated apparatus.

Accordingly, it is an object of the present invention to provide for dynamic runout measurement by apparatus and methods that provide simple, precise, and repeatable measurements of high accuracy.

SUMMARY OF THE INVENTION

In carrying out principles of the present invention in accordance with a preferred embodiment thereof, a pair of magnetic cores produce a sensor signal having first component indicative of runout and a second component indicative of static offset of the rod from a centered position. An offset signal is employed to modify the sensor signal so as to decrease the static offset component and prevent signal saturation. The cores have AC excited coils and are mounted substantially symmetrically on opposite sides of a rotating rod. The coils are excited by opposite phase signals which are differentially combined to provide a sensor signal that indicates difference in reluctance of the air gaps between the rotating bit and respective ones of the cores. The sensor signal is selectively sampled to provide an indicated runout signal, which is peak detected to display peak to peak amplitude of the runout signal. The indicated runout signal, which varies as the rod rotates, is filtered to provide an offset signal indicative of average position of the rod between the cores, and this offset signal is employed to produce a compensating signal that is combined with the sensor signal from the coils of the sensors. This effectively electrically centers the rod between the cores by reducing the sensor signal component due to static offset. To initially position the cores as closely as possible at equal distances from the rod, the cores are mounted for a small amount of shifting radially of the rod, and the compensating signal is employed to drive a display that indicates proper positioning of the cores within a selected window of tolerance.

BRIEF DESCRIPTION OF THE DRAWINGS

FIG. 4 is a block diagram of a system for measuring the rod runout while the rod rotates;

FIGS. 6a-f show several wave forms of the autocentering portion of the system.

DETAILED DESCRIPTION OF THE INVENTION

Measuring methods and apparatus of the present invention find application in dynamic measurement of wobble or runout in a number of different types of rotating machines. The invention may be applicable to automatic chucking machines, where a bit or part is picked up by a chuck and must be rotated with a predetermined minimum amount of wobble. The apparatus and method also have application to lathes or grinding machines. However, the invention has been initially embodied in a system for dynamic measurement of wobble of a magnetic test rod of a high speed spindle of a multiple spindle circuit board drilling machine and will be described in connection with such a spindle.

Figure 1:
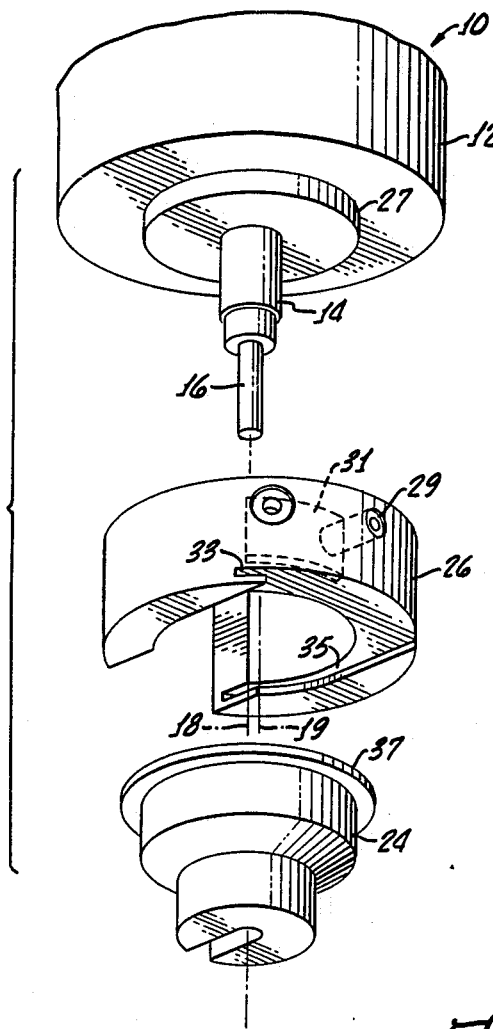
FIG. 1 is an exploded pictorial view of a high speed drill spindle and runout measuring instrument embodying the present invention.

As illustrated in FIG. 1, a typical drilling machine spindle 10 includes a fixed housing 12 having a rotating chuck or collet 14 in which is mounted a high speed drill test pin 16. The magnetic test pin or rod 16 always replaces the bit when runout measurement is made. The drill bit may be of small diameter, from ⅛th of an inch down to as small as 4/1,000ths of an inch, having a ⅛th inch shank. Frequently bits of such small size are rotated at speeds of up to 120,000 revolutions per minute and are commonly operated at at least 14,000 revolutions per minute. If the spindle, chuck or collet is not precisely configured, or should slightly bend during rotation, the bit will be radially displaced from the spindle rotation axis 18. This displacement of the bit as it rotates is termed "runout" or "wobble", and may be a significant factor in breakage of the bit during the drilling operation. Further, the wobble or runout may vary significantly with variation of speed of bit rotation, so that measurement of runout while a test rod is static or rotating at low speeds may provide little or no useful information concerning wobble at bit operating speeds.

Figure 2:
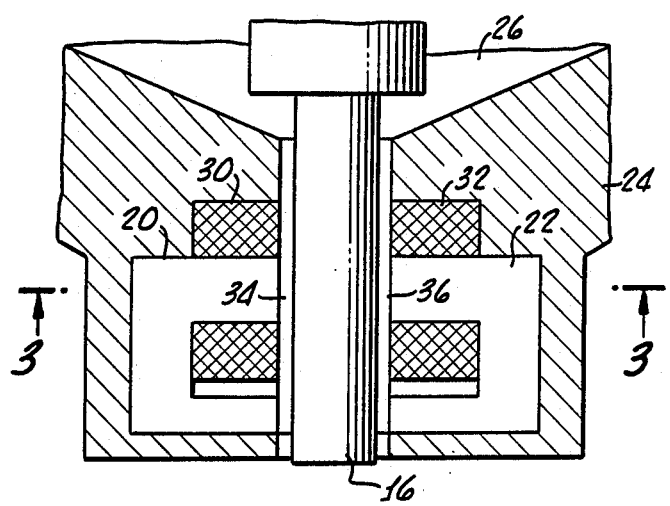
FIG. 2 is a vertical sectional view showing the spindle, bit and dynamic runout sensing apparatus attached thereto.
Figure 3:
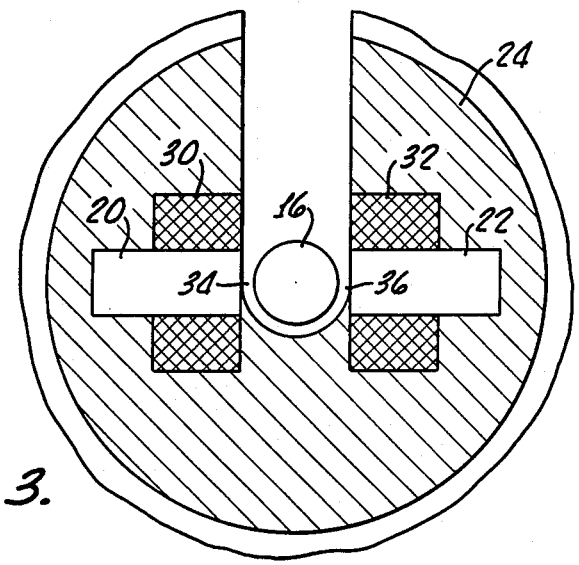
FIG. 3 is a horizontal section taken through the measuring apparatus illustrating rod wobble and the position of the cores relative to the rod.

According to a presently preferred apparatus incorporating principles of the present invention, a pair of c-shaped magnetic cores 20,22 (FIGS. 2 and 3) are fixedly mounted, as by potting, in a core holder 24, which is mounted for rotation in a spacer block 26 that is clamped to a boss 27 of the fixed spindle housing 12. The core holder is mounted to rotate about a core holder axis 19 (FIG. 1) that is slightly displaced from the spindle axis 18. The spacer block 26 and core holder 24 are vertically slotted in a radial direction to provide aligned open slots by which the apparatus may be laterally applied to a drill, spindle and test rod. Spacer block 26 is secured to the spindle housing boss 27 by a suitable clamping mechanism such as a set screw 29 which bears against a plate 31 movably carried by block 26 to rigidly attach the block to the spindle housing.

The block has a pair of horizontal slots 33,35 which slidably receive an outwardly projecting integral circular flange 37 of the core holder, which is thus firmly but rotatably fixed to block 26. A pair of coils 30,32 are mounted on the cores 20,22 respectively for energizing magnetic circuits that include the magnetic pin 16 and the respective cores. Each magnetic circuit includes a very small air gap, such as gaps 34,36, between the pin 16 and the respective cores. It is important to initially or statically center the pin, as closely as possible, between the cores so that the pin will not contact the cores as it rotates with some wobble. This is done mechanically. It is also necessary to prevent any remaining static offset of the pin from causing an increase in the sensor output that will saturate the measuring circuit. This is done electrically by auto-centering circuitry.

In order to roughly position the cores to be equally spaced from the test pin so that the gaps 34,36 are nominally equal to one another when the pin is not rotating and the pin will not touch the cores, the core holder is eccentrically mounted within the block 26 so that a small amount of manually controlled rotation of the cores and holder 24 relative to the block about the core holder axis 19 will radially shift both cores relative to the pin axis 18. Thus, for example, a manual eccentric adjustment of the cores is such as to enable the cores to be shifted so that the core center 19 may be moved from an actual position shown in FIG. 1 toward the spindle axis 18. Suitable means, not shown, may be provided to lock the core holder to the block after its eccentric adjustment. Of course the eccentric rotation will change the angular relation of the plane of alignment of the two cores, but for purposes of the present invention, it is only the position of the cores along a radius that bisects the two cores that is of interest. As will be more particularly described below, manual adjustment of the cores toward a rough position of symmetry is difficult, if not impossible, to accomplish within the five to ten millionths of an inch accuracies desired, so that an additional electronic auto-centering circuit is employed for electronically centering the pin between the cores. Such electronic centering comprises varying the sensor signal so as to avoid saturation.

Illustrated in FIG. 4 is a block diagram of an electrical system for energizing the coils 30,32 and processing a signal derived from the coils to provide a indication of dynamic runout. An oscillating and timing circuit 100 provides a series of clock pulses on an output line 102 and a pair of opposite phase square wave signals on a second output line 104. The various lines 102,104 etc of the block diagram may denote one or more electrical leads. The square wave signals, which drive the coils, may have a frequency of approximately 40 kilohertz. This coil driving frequency is many times greater than the highest expected rotational speed of the test pin so that measurement samples of the coil signals are taken many times for each revolution of the pin. The opposite phase square wave drive signals are fed through a square wave driver 106 to opposite ends of the coils 30,32, which are connected in series so that at their junction 108 appears a signal representing the difference in voltages across the coils.

If it were possible to have precisely identical cores and coils, and precisely identical magnetic gaps 34,36 between the test pin and the cores, the signals in coils 30 and 32, which buck against each other, would provide a zero sensor output at point 108. Such perfect symmetry is not possible in a practical device. Should the pin be offset so that it is closer to one of the cores than the other, the reluctance in one of the gaps decreases while the reluctance in the other gap increases so that a differential sensor signal is provided at point 108, to be sent as one input to a summing network 110. A second input to the summing network, on a line 111, is derived from an auto-centering circuit 113 to be described more particularly below. The output of the summing network is fed to a preamplifier 112, and thence through a pair of sampling gates 114, which are enabled by clock pulses on line 102 at selected short intervals following the leading edges of the driving square waves.

Figure 5:
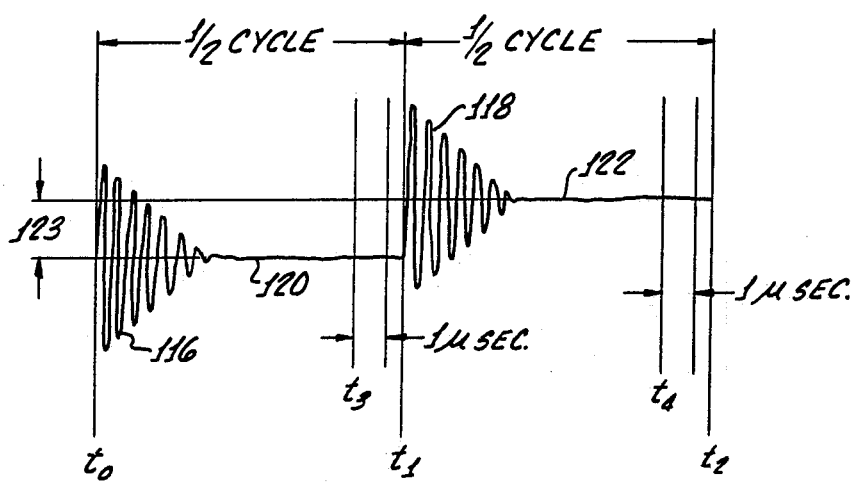
FIG. 5 illustrates certain sensor wave forms.

Referring to FIG. 5, there is shown a graph of the sensor signal at the output of preamplifier 112 over two successive half cycles. Presuming the magnetic pin wobbles as it rotates between the cores, so that the two core gaps 34,36 are of different magnitudes, the output of the preamplifier is basically a square wave, having a leading edge at a time $t_0$, a half cycle point at time $t_1$, and trailing edge at time $t_2$. Because of various circuit impedances, the sharply rising and falling leading edge of the square wave is not clean, but fluctuates or rings, as indicated at 116. Similarly, as the square wave sensor signal changes polarity at the half cycle, there is an additional fluctuation or ringing, as indicated at 118. The desired measurement signal, indicative of the runout, is the difference in levels between the first half cycle of the square wave of FIG. 5, indicated at 120, and the second half cycle, indicated at 122. The magnitude of this difference is indicated at 123 of FIG. 5.

In order to properly measure the difference 124 and avoid spurious measurement caused by the ringing at the leading edge of each half cycle, the half cycles are sampled for short intervals, starting at time $t_3$ in the first half cycle and at time $t_4$ in the second half cycle. Each sample period is a small fraction of the duration of the half cycle and is initiated at a time that is suitably delayed from the respective half cycle initiation to a time where the signal is substantially quiescent. For example, where each half cycle of the square wave illustrated in FIG. 5 is about twelve microseconds, each sample time is initiated at a time at least nine microseconds or more following the leading edge of the half cycle and has a duration of about one microsecond. Thus it is sure that the sampled square wave will have had sufficient time to settle down to a quiescent state so that the sample does not include any of the ringing which occurs at the beginning of each half cycle. Because of the relatively high sampling frequency, the pin rotates through only a very small angle between successive sample periods. It may be noted at this point that the use of square waves to drive the sensor coils 30 and 32 provides a significant advantage as compared with use of sine waves to drive the coils, in that it is much more difficult to identify a repeatably selectable quiescent point on the sine waves for obtaining accurate sampling.

The sample of each of a pair of successive half cycles of the square wave sensor signal, from gates 114, is separately stored in a storage device 116 from which the two stored signals are fed as inputs to a differential amplifier 118. At the output of differential amplifier 118 the difference between the stored signals appears as the desired runout signal, having a magnitude that is a measure of wobble of the pin 16 as it rotates at high speed. This signal varies substantially sinusoidally with rotation of the pin but has a peak to peak magnitude representing pin runout. The sine wave has its peak when gaps 34 and 36 ar respectively maximum and minimum or minimum and maximum. This runout signal may be presented for display in a suitable device, such as an oscilloscope 120. The peak to peak magnitude of the runout signal of the output of amplifier 118 is proportional to the runout. In the absence of auto-centering (to be described below) the average level of the runout signal is proportional to static offset of the center of pin 16 from a point equidistant from the two cores. This is the average position of the pin as it rotates.

For precision readout of runout, the runout signal at the output of amplifier 118 is fed via a line 122 to upper and lower peak detectors 124 of which the outputs are fed to storage devices 126 where the upper and lower peaks of the runout signal are stored. The two stored signals from storage device 126 are fed to a second differential amplifier 128, at the output of which appears the difference between the peaks, namely the peak to peak amplitude of the runout signal, which is fed to a meter 130, such as, for example, a Texmate SM-36-XV050K, which provides a digital reading.

As previously indicated, it is difficult, if not impossible, to precisely position the two cores so that the two gaps 34,36 are exactly equal when the magnetic pin 16 is at rest. Therefore, provision is made for a course manual adjustment to physically position the cores so that, with a maximum of expected wobble, there will be no physical contact between the pin and the very closely spaced cores. It is preferred to make the gaps 34,36 nominally about 1/100th of an inch in length. With such small gaps, a small amount of offset of the cores could result in contact with the pin as the latter rotates and wobbles. Therefore, as previously described, the cores are relatively shiftable radially of the pin and relative to the pin in the core holder, which is then fixed to the spindle housing. This manual physical adjustment will prevent core to pin contact but cannot center the cores with sufficient precision to prevent the resulting sensor signal from attaining saturation magnitude. Therefore an auto-centering signal is provided to effectively electronically center the pin between the cores by diminishing the sensor signal by an amount proportional to the static offset of the pin centerline from a line midway between the two cores. The auto-centering signal does not physically affect pin position, but rather modulates the sensor signal to prevent saturation.

Accordingly, the runout signal at the output of amplifier 118 is fed to the auto-centering circuit 113. This circuit includes a long time constant filter 136 which provides an average value of the sinusoidal runout signal. This average value is compared to a reference potential in a center reference circuit 138 to generate a modulating signal on a line 140 that is fed as a modulating input to a square wave modulator 142. A second input to modulator 142 from the square waves produced by oscillator 100 is provided on a line 144, resulting in a modulated square wave output on line 111, at the output of the modulator, which has appropriate phase and a magnitude proportional to the static pin offset or the average position of the pin as it rotates. This modulated square wave signal on line 111, as previously mentioned, is combined with the sensor signal from point 108 in the summing network 110 for feeding to preamplifier 112. Thus, the sensor signal from point 108 has a first component (its peak to peak magnitude) indicative of runout and a second component (its average value) indicative of static offset.

To assist in manual centering, a pair of centering limit lights indicated generally at 146 ar energized individually from the modulating signal at the output of center reference circuit 138 so that a first light will go on when the cores are too far to one side, and a second light goes on when the cores are too far to the other side. This enables effective centering within a window of acceptable physical tolerance, so as to ensure that the pin will physically clear both cores as the pin wobbles in its high speed rotation.

Figure 7:
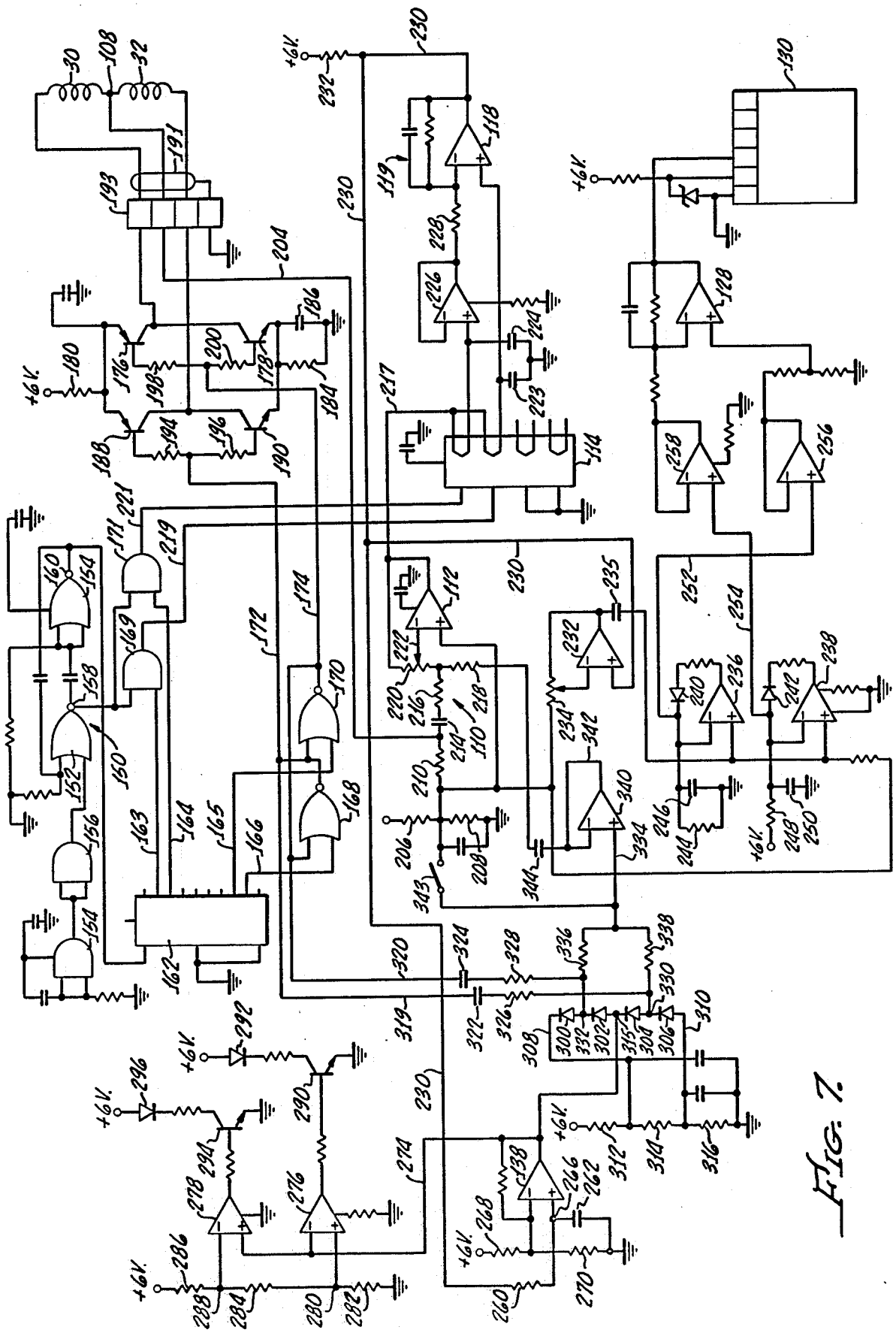
FIG. 7 is a circuit diagram of the system of FIG. 4.

The circuit diagram of FIG. 7 illustrates detailed circuitry of the block diagram of FIG. 4. An oscillator or multi-vibrator 150 is formed of a pair of interconnected NOR gates 152,154, triggered by a pair of NAND gates 154,156 that are provided to ensure starting of the multi-vibrator. Output terminals 158,160 of the gates of the multi-vibrator provide square waves of mutually opposite phase at a base driving frequency of about 400 kilohertz. The output of gate 154 is provided as a trigger input to a modulo ten counter, such as a Johnson Counter 162, of which four outputs on lines 163, 164, 165 and 166 are used, each dividing the trigger input by ten to provide time displaced square wave outputs on each line at about 40 kilohertz.

Outputs of the Johnson Counter on lines 165 and 166 are fed to respective gates 168,170 connected as a coil driver flip flop, having outputs on lines 172 and 174 respectively which are fed to first and second driving circuits for the coils 30 and 32. The driving circuit for coil 30 comprises a pair of opposite polarity transistors 176,178 connected in series between a potential source, such as plus six volts, via an RC circuit including a resistor 180, and ground, via an RC circuit 184,186, with the driving voltage for coil 30 being obtained from the collector of transistor 176 via a connecting plug 193. The coil input wires are shielded as indicated at 191.

The driving circuit for coil 32 is comprised of a pair of series connected opposite polarity transistors 188,190 connected between the plus six volt potential via an RC circuit including a resistor 180 and ground via the RC circuit 184,186. Square wave drive signals are fed from the flip flop outputs on lines 172,174 to the driving circuits at the junction of resistors 194,196, which are connected respectively to the bases of transistors 188,190, and at the junction of resistors 198,200, which are connected respectively to the bases of transistors 176,178.

When the signal on line 172 is high, transistor 188 is cut off, and transistor 190 conducts. At the same time line 174 is low, transistor 176 conducts and transistor 178 is off. Current flows from a positive potential through resistor 180, and transistor 176 to coils 30 and 32, and thence through transistor 190 and resistor 184 to ground. On the opposite half cycle, current flows through the two coils in the opposite direction because line 172 is low, line 174 is high, and transistors 188 and 178 conduct while transistors 190 and 176 are cut off.

Coil 30, for example, is driven by a positive going half cycle of its driving square wave, while at the same time coil 32 is driven by a negative going half cycle of its driving square wave. The signals in the two coils buck each other and are differentially combined at point 108 to provide the sensor signal from the coils. This sensor signal is fed from the common terminal 108 via line 204 and a DC blocking capacitor 214 to the resistive summing network 110 (see FIG. 4) consisting of resistors 216 and 218. The output of summing network 110 is connected to a gain controlling potentiometer 220 of which the wiper arm 222 is connected to the inverting input of preamplifier 112, also shown in FIG. 4.

The output of preamplifier 112 appears on a line 217 from which it is fed to the input of dual gate 114, which also receives the outputs of sample controlling AND gates 169 and 171 on lines 219,221, respectively. For generation of appropriately delayed sampling signals, the square wave from oscillator gate 152 is provided as one input to AND gate 169, which has as its second input the much lower frequency square wave from line 163 of the counter. Thus the output of gate 169 on line 219 is a short period sampling pulse delayed appropriately from the leading edge of a first half cycle of the driving square wave. Similarly, AND gate 171 has inputs from the output of multi-vibrator gate 152 and the counter output on a line 164 to provide a second short period sampling pulse on line 221, delayed appropriately from the leading edge of a second half cycle of the driving square wave. The gate controlling sample signals on lines 219,221 allow the preamplifier signal on line 217 to pass through gates 114 during the very narrow sample times. The outputs of the two gates 114 are fed respectively to storage capacitors 223,224 which are small enough to be fully charged and discharged during the very small sampling interval. These capacitors may be, for example, in the order of 100 pico farads each. The output of storage capacitor 223 is fed to the non-inverting input of the first differential amplifier 118 (see also FIG. 4). Via an impedance lowering unity gain amplifier 226 and a resistor 228 the output of capacitor 224 is fed to the inverting input of amplifier 118, having an RC feedback circuit 119 to limit its gain and reduce noise spikes. The output of the differential amplifier on a line 230 is fed via a resistor 232 to oscilloscope 120 (FIG. 4) for displaying the sinusoidally varying runout signal.

The peak to peak magnitude of runout signal on line 230 (which is the desired wobble measurement) is also displayed in the digital meter 130 and is fed to the meter via line 230 and a calibrating differential amplifier 232. The runout signal on line 230 is fed to the non-inverting input of the amplifier 232, which has a calibrating potentiometer 234 in its feedback loop, between its output and its inverting input In an exemplary embodiment the calibration is established so that amplifier 232 provides an output of 1 volt peak to peak for a 0.001 inch motion of the pin. The output of calibrating amplifier 232 is fed via a capacitor 235 to the non-inverting inputs of first and second peak detector amplifiers 236,238. Oppositely poled diodes 240,242 are connected in the feedback paths of amplifiers 236 and 238 respectively. A parallel RC circuit comprised of resistor 244 and capacitor 246 is connected between ground and the inverting input of amplifier 236, and a series RC circuit comprised of resistor 248 and capacitor 250 is connected in series between a positive potential and ground. Junctions of components of the RC circuits are connected to the inverting inputs of amplifiers 236,238. Capacitors 246 and 250 are connected to the cathode and anode respectively of the feedback diodes 240 and 242 so that these will store the positive and negative peaks respectively of the runout signal. The two signal peaks are fed from the capacitors via lines 252 and 254 to unity gain impedance controlling amplifiers 256 and 258 respectively, which provide inputs to the non-inverting and inverting inputs respectively of second differential amplifier 128 (see also FIG. 4). The output of this amplifier, which is the peak to peak magnitude of the runout signal, is fed to the digital readout meter 130. Accordingly the meter will display the magnitude of runout in millionths of an inch. It has been found that the meter reading is repeatable to within five to ten millionths of an inch.

For the auto-centering operation, the runout signal on line 230 is also fed to a long time constant filter comprising a resistor 260, which may be in the order of 2.2 megohms and a capacitor 262 which may be in the order of 0.22 micro farads. The filtered runout signal at point 266 between resistor 260 and capacitor 262 is fed to the non-inverting input of a center reference amplifier 138 (see also FIG. 4) which has its inverting input held to a center voltage, such as three volts, by connection to the midpoint of a voltage divider comprised of resistors 268,270 connected between plus six volts and ground. Center reference amplifier 138 compares the runout signal with a voltage that is midway between the plus six volts employed in this system and ground. The magnitude of the difference between the filtered runout signal and the midpoint reference is the static offset signal, which is proportional to the average position of the rotating pin between the sensor cores. When the filtered runout signal at point 266 is equal to the midpoint voltage, there is no offset signal from the output of amplifier 158. If the average or DC value of the sinusoidal runout signal is greater or less than the voltage reference established at the inverting input of the amplifier, the amplifier output is greater or less and thus this output indicates the average position of the rotating pin between the cores. In other words, the output of amplifier 138 has a value generally proportional to the static offset of the pin centerline from a position precisely equidistant between the two cores.

This offset exists, as previously mentioned, despite efforts to manually shift the cores so as to center the pin between the cores. Furthermore, even though the offset component of the sensor signal at junction 108 of the sensor coils is decreased by the auto-centering circuitry, some of this offset still remains in the runout signal from which it is extracted by the filter 260,262. However the remaining part of the offset component does not interfere with accuracy of the runout measurement, because runout is proportional to peak to peak magnitude which is independent of the static offset component.

The auto-centering compensation accomplished in summing network 110 at the input to preamplifier 112 is not complete (e.g. all of the offset component is not removed), at least partly because the gain of amplifier 138 is relatively low (about 5 in an exemplary embodiment). Therefore, the offset compensated sensor signal fed to the preamplifier input still includes some of the static offset, although such offset component has been reduced to ensure that the circuit does not saturate. This remaining offset component exists in the runout signal at the output of differential amplifier 118 and, when filtered in the filter 260,262, at the input of amplifier 138, can be used to provide the modulating input offset signal to the modulator 142. The presence of the offset component in the runout signal on line 230 does not affect the measurement displayed by meter 130 because the meter displays only the peak to peak magnitude and is insensitive to the average value of the sinusoidal runout signal.

As previously mentioned, the cores are initially positioned manually by the use of indicator lights. These lights are driven by the static offset signal provided at the output of amplifier 138. To this end this signal is fed via a line 274 to inverting and non-inverting inputs respectively of differential amplifiers 276,278. Amplifier 276 has its noninverting input connected to a point 280 between resistors 282 and 284 of a voltage divider, which includes a third resistor 286, all series connected between plus six volts and ground. The junction of resistors 286 and 284, at point 288, is connected to the inverting input of amplifier 278. The values of the resistors of the voltage divider are established so that a voltage of approximately 2.8 volts appears at point 280 and a voltage of approximately 3.2 volts appears at point 288. If the offset or centering voltage on line 274 is below the voltage at point 280, a transistor 290, having its base connected to the output of amplifier 276, is caused to conduct to energize a light emitting diode 292 connected between a positive potential and the transistor collector If the offset voltage signal on line 274 is above the potential at point 288, a transistor 294, having its base connected to the output of amplifier 278, is caused to energize a light emitting diode 296 connected between a positive potential and the transistor collector. Lighting of diode 296 indicates that the cores are too far to one side, whereas the lighting of diode 292 indicates the cores are too far to the other side. If either diode lights, manual adjustment of the cores is carried out to a point where both lights are dark, and it is known, then, that the offset signal is within a selected range of magnitudes that is chosen (by voltages established at points 280,288) to ensure that the rotating pin will not physically contact either core. Thus the light emitting diodes 296,292 employ the offset signal for an initial or coarse physical positioning of the cores relative to the pin.

For electronic auto-centering, the coil driving square waves are modulated according to the offset signal at the output of amplifier 138 and combined in resistive network 110 with the sensor signal from the coil junction 108.

For this auto-centering, a group of series connected diodes 300,302,304 and 306 are connected anode to cathode between preselected voltages at points 308,310. The voltages at points 308, 310 are established at predetermined levels, such as plus four volts and plus two volts respectively, for example, by being connected to the junction points of resistors of a voltage divider comprised of resistors 312,314 and 316 connection between positive potential, such as six volts and ground. The offset signal from the output of amplifier 138 is fed to the midpoint 315 of the series of diodes, which is the junction of the cathode of diode 304 and the anode of diode 302. From the gates 168 and 170 of the coil driver flip flop, driving square waves are provided on lines 319,320, which are fed via capacitors 322,324, and resistors 326 and 328 to points 330 and 332 respectively, which are the junctions between the anode of diode 304 and the cathode of diode 306, for point 330, and the junction of the anode of diode 300 and the cathode of diode 302 for point 332. The arrangement effects modulation of the square waves on lines 319,320 in accordance with the level of the offset or modulating signal at point 315. The modulated signals are combined to provide, on a modulator output line 334, an offset compensating signal that is to be combined with the sensor signal at the input of the preamplifier.

The two square waves applied to points 332 and 330 are each modulated by the offset signal, and then are combined by resistors 336,338 to provide the desired square wave compensating signal of appropriate phase and magnitude. The square wave drive signal fed from the flip flop via line 320 to diode junction 332 varies between the fixed voltage at the cathode of diode 300 and the voltage at point 315, which is the offset signal voltage (except for the forward drops across the conducting diodes). Assuming, for example, that the offset signal has a level of plus 2.5 volts, the square wave at point 332 will vary between 2.5 and 4 volts, as indicated in FIG. 6a. Concomitantly, the opposite phase signal fed via line 319 to point 330 will vary between plus 2 volts, the fixed voltage at the anode of cathode 306, and the offset signal level at point 315. Again, assuming the offset signal at point 315 is 2.5 volts, the square wave signal at point 330 varies between 2.5 and 2.0, as illustrated in FIG. 6b, and is of a phase opposite the phase of the signal at point 332. The two signals are combined by summing network 336,338 to provide a combined square wave signal, indicated in FIG. 6c, which varies between the offset signal level of the assumed 2.5 volts and a level equal to the difference between the magnitudes of the signals of FIGS. 6a and 6b. Should the offset signal go above 3 volts, to have a level such as +3.5, for example, the square wave at point 332 will vary between such increased offset voltage level and 4.0 as indicated in FIG. 6d. Concomitantly, the signal at point 330 will vary between 2 volts and the higher offset signal of 3.5 volts, as indicated in FIG. 6e, to provide the combined square wave signal of FIG. 6f, varying between 2.0 volts and the offset centering signal level 3.5 volts. This combined signal of FIG. 6f is of phase opposite the phase the combined signal of FIG. 6c, illustrating the fact that as the offset signal goes above or below the 3 volt midpoint of this system the phase of the offset compensation signal on line 334 changes. If the offset signal at point 315 is precisely 3 volts, the centering signal on line 334 is zero, and no compensation of the sensor signal is needed or accomplished.

The auto-centering offset compensation signal on line 334 is fed to the non-inverting input of a unity gain differential amplifier 340, having an output on a line 342 that is fed via a capacitor 344 to resistor 218 of summing network 110, where it is combined with the sensor signal fed through resistor 216. Thus, saturation of the sensor square wave signal at the input of preamplifier 112 is prevented by diminishing the sensor signal by a square wave of appropriate phase and of a magnitude determined by the amount of static offset of the pin or bit from a point equidistant from the two cores.

The auto-centering circuit may be disabled by a manually operable switch 343, which, when closed, connects line 334 at the junction of resistors 336 and 338 to the voltage divider 206,208 which provides the 3 volt circuit center reference to amplifier 112.

Although the described embodiment derives the offset signal from the same sensors and sensor signal that measure runout, it will be readily appreciated that separate sensors and circuits may be used, alternatively, to detect static offset and provide effective auto-centering to avoid saturation.

There have been described methods and apparatus for dynamically measuring runout or wobble of very small diameter high speed bits, which methods and apparatus are applicable to measurement of many different types of rotary devices. The measurements have high precision, down to a few millionths of an inch, are repeatable, and are readily and quickly made. The apparatus is easier to assemble mechanically and is simple, easier to set up and operate, than prior devices. Employing differential reluctance of a pair of magnetic circuits, which include the rotating magnetic test pin, sensor signals of high level are produced that may be readily processed and measured. The sensor signal, after static offset compensation in the preamplifier, has a magnitude in the order of volts rather than micro-volts or milli-volts. For example, in an exemplary system, one volt at the output of preamplifier 118 represents 0.001 inches of runout, and 0.1 volts at the amplifier output represents 0.0001 inches of runout. Test results indicate that the voltage variation at the preamplifier output is linearly related to the magnitude of runout.

These signal levels are produced without excessive gain requirements. For example, gain of preamplifier 112 is approximately 10, gain of impedance lowering amplifier 226 is unity, and gain of differential amplifier 118 is about 12.

The system provides for automatic compensation for static offset resulting from asymmetrical positioning of the magnetic sensor cores with respect to the rotating pin, so as to further refine precision of the measurement.

The foregoing detailed description is to be clearly understood as given by way of illustration and example only, the spirit and scope of this invention being limited solely by the appended claims.

What is claimed is:

1. A method of dynamically measuring position of a member rotating about an axis comprising the steps of:
providing diametrically opposed first and second magnetic members on opposite sides of said rotating member,
positioning said first and second magnetic members to be nominally equidistant from said rotating member,
rotating said rotating member,
measuring a first magnetic reluctance between the rotating member and said first magnetic member and a second magnetic reluctance between the rotating member and said second magnetic member while the rotating member rotates, and
combining the measured first and second reluctances,
employing said combined reluctances to indicate runout of said rotating member while it rotates,
said step of measuring comprising providing a coil on each magnetic member, energizing said coils respectively with first and second opposite phase square waves of a frequency that is substantially greater than the rotational speed of said rotating member, differentially combining signals in said first and second coils to produce a cyclic sensor signal having first and second half cycles, sampling at least some of said half cycles at times delayed by more than half the duration of a half cycle from the initiation of such half cycle to provide first and second sensor samples, each having a duration considerably less than the duration of one of such half cycles, and differentially combining samples of pairs of said samples to provide a runout signal.

2. The method of claim 1 including the step of filtering said runout signal to provide an auto-centering signal indicative of average position of the rotating member between the magnetic devices, employing said auto-centering signal to modulate said square waves, and combining said modulated square waves with said sensor signal to provide a compensated sensor signal.

3. The method of claim 2 wherein said runout signal cyclically varies between upper and lower signal peaks as the rotating member rotates, and including detecting said upper and lower peaks, generating a signal indicative of the difference between said upper and lower peaks, and displaying said last mentioned signal to provide a display of measured runout of said rotating member.

4. The method of claim 3 wherein said rotating member is an elongated magnetic element mounted in a drill spindle having an operating speed of at least 14,000 revolutions per minute, and wherein said first and second opposite phase square waves have a frequency many times greater than the speed of rotation of said rotating member, whereby samples of half cycles of said sensor signal are taken while the rotating member is within a relatively small sector of its rotation.

5. A method of dynamically measuring position of a member rotating about an axis comprising the steps of:
providing diametrically opposed first and second magnetic members on opposite sides of said rotating member,
positioning said first and second magnetic members to be nominally equidistant from said rotating member,
rotating said rotating member,
measuring a first magnetic reluctance between the rotating member and said first magnetic member and a second magnetic reluctance between the rotating member and said second magnetic member while the rotating member rotates,
combining the measured first and second reluctances, and
employing said combined reluctances to indicate runout of said rotating member while it rotates,
said step of measuring comprising providing a coil on each said magnetic member, driving said coils with first and second square wave drive signals of mutually opposite phase having a frequency considerably greater than the speed of rotation of said rotating member, differentially combining signals in said coils to generate a sensor signal, generating an auto-centering compensating signal representative of average position of said rotating member between said magnetic members, employing said auto-centering compensating signal to modify said sensor signal and produce a compensated sensor signal, sampling successive half cycles of said compensated sensor signal, generating a runout signal indicative of the difference between sampled successive sensor signals, said step of generating an auto-centering compensating signal comprising filtering said compensated sensor signal, comparing the filtered sensor signal to a reference potential to generate an auto-centering modulating signal, deriving square wave modulator signals from said square wave drive signals, and modulating said square wave modulator signals by said auto-centering modulating signal to provide said auto-centering compensating signal.

6. Apparatus for sensing wobble of a rotatable member mounted in a rotor having a support in which the rotor is journalled, said apparatus comprising:
  a housing configured and arranged to be fixedly supported with respect to the rotor support and to extend along said rotatable member,
  first and second magnetic cores,
  core mounting means for mounting the cores to the housing, said cores being configured and arranged in said housing to be nominally equally spaced from said rotating member on opposite sides thereof, each core forming part of a magnetic circuit including a gap between the core and the rotating member, whereby reluctance of such magnetic circuits will vary with the length of said gaps,
  first and second coils on said cores respectively,
  a driving signal source having an alternating signal output connected to energize said coils, whereby coil signals are generated in said coils.
  means for differentially combining said coil signals to generate a sensor signal having a magnitude indicative of the wobble of said rotating member, and
  output means for indicating said magnitude,
  said alternating signal output comprising a pair of square waves of mutually opposite phase, said sensor signal being a square wave having first and second successive half cycles with leading edges, means for sampling successive half cycles of said square wave sensor signal at times delayed from the leading edges thereof, and means for indicating difference between individual samples of pairs of said samples as a measurement of wobble of said rotatable member.

7. The apparatus of claim 6 wherein said means for sampling comprises means for storing each sample of a pair of successive samples of said sensor signal and means for generating a wobble signal indicative of the difference of the samples of a stored pair.

8. The apparatus of claim 7 including means responsive to said wobble signal for generating an offset signal indicative of the average position of the rotatable member between said cores, and means for diminishing said sensor signal by said offset signal to generate an auto-centered compensated sensor signal, and wherein said means for sampling comprises means for sampling said auto-centered compensated sensor signal.

9. The apparatus of claim 6 wherein said rotatable member is displaced from a position equidistant between said cores by an offset, means for generating an offset signal indicative of said offset, means for generating square wave modulator signals from said signal source, means for modulating said modulator signals with said offset signal to generate modulated offset signals, and means for modulating said square wave sensor signal in accordance with said modulated offset signals.

10. The apparatus of claim 6 wherein said means for indicating difference between successive samples includes means for generating a runout signal, and including means for filtering said runout signal to provide a filtered runout signal, means for comparing the filtered runout signal with a reference potential to provide an offset signal, means responsive to said signal source for generating modulator signals, means for modulating said modulator signals with said offset signal to provide an auto-center compensating signal, and means for combining the auto-center compensating signal with said sensor signal.

11. In combination with a high speed spindle having a fixed spindle support mounting a high speed rotor that carries an elongated rotary tool, improved dynamic tool runout measuring apparatus comprising:
  a housing adapted to be fixed to said spindle support to extend along said tool,
  a pair of magnetic cores mounted in the housing on opposite sides of an nominally equally spaced from said tool,
  first and second series connected coils on said first and second cores respectively,
  an oscillating and timing circuit generating first and second opposite phase square waves and a plurality of timing signals,
  square wave drive means responsive to said opposite phase square waves for energizing said coils with square waves having mutually opposite phase in respective ones of said coils,
  a preamplifier having an input summing network with first and second inputs, said first input being differentially connected to both of said coils, said preamplifier having a square wave sensor output having successive half cycles,
  a gating circuit having an input connected to the output of said preamplifier and having control inputs connected to receive said timing signals from said timing circuit, said gating circuit including first and second gates connected to be opened during short intervals of successive half cycles of the output of said preamplifier and having outputs,
  first and second temporary storage devices connected to the outputs of said first and second gates respectively,
  a first differential amplifier having inputs from said first and second storage devices and having an output,
  indicator means connected to the output of said first differential amplifier,
  a filter having an input connected to the output of said first differential amplifier and having an output,
  a center reference circuit having an input connected to the output of said filter, having a reference input and having an output, and
  a modulator having first and second inputs connected to receive opposite phase square waves from said oscillating and timing circuit, said modulator having a modulating input connected to the output of said center reference circuit, and having an output connected to the second input of said input summing network of said preamplifier.

12. The apparatus of claim 11 including first and second lamps, first and second comparison circuits for comparing first and second reference potentials with said center reference circuit output, said comparison circuits each having an output connected to energize a respective one of said lamps.

13. The apparatus of claim 11 including high and low peak detectors having inputs connected to the output of said first differential amplifier, and having first and second outputs, third and fourth storage devices connected to receive said first and second outputs of said peak detectors, and having third and fourth storage device outputs, a second differential amplifier connected to receive said third and fourth storage device outputs, said second differential amplifier having output, and a digital display meter having an input connected to the output of said second differential amplifier.

14. The instrument of claim 13 wherein said sensors comprise first and second magnetic cores having respective first and second mutually connected coils thereon, said means for generating a sensor signal comprising means for driving said coils with square waves of mutually opposite phase, whereby said sensor signal comprises a sensor square wave, means for sampling successive half cycles of said sensor square wave, means for differentially combining samples of said successive half cycles to provide a runout signal having said first and second components, means responsive to said second component for modulating said sensor square wave, and means for indicating said first component as a measure of dynamic runout.

* * * * *